(12) United States Patent
Rai et al.

(10) Patent No.: US 8,379,255 B2
(45) Date of Patent: Feb. 19, 2013

(54) METHOD AND SYSTEM OF DETERMINING BATCH SIZES FOR PRINT JOBS IN A PRINT PRODUCTION ENVIRONMENT

(75) Inventors: Sudhendu Rai, Fairport, NY (US); Jeremy John Tejada, Londonderry, NH (US)

(73) Assignee: Xerox Corporation, Norwalk, CT (US)

( * ) Notice: Subject to any disclaimer, the term of this patent is extended or adjusted under 35 U.S.C. 154(b) by 721 days.

(21) Appl. No.: 12/496,097

(22) Filed: Jul. 1, 2009

(65) Prior Publication Data

US 2011/0002004 A1 Jan. 6, 2011

(51) Int. Cl.
*G06F 3/12* (2006.01)

(52) U.S. Cl. ......... 358/1.15; 400/61; 718/101; 718/104; 718/105; 718/107; 700/46; 700/99; 700/151; 700/223

(58) Field of Classification Search ................. 358/1.15; 718/101, 104, 105, 107; 700/46, 99, 151, 700/223
See application file for complete search history.

(56) References Cited

U.S. PATENT DOCUMENTS

| | | | |
|---|---|---|---|
| 6,805,502 B2 | 10/2004 | Rai et al. | |
| 7,051,328 B2 | 5/2006 | Rai et al. | |
| 2002/0124756 A1 | 9/2002 | Rai et al. | |
| 2002/0129081 A1 | 9/2002 | Rai et al. | |
| 2003/0142348 A1 * | 7/2003 | Hiramatsu et al. | 358/1.15 |
| 2003/0149747 A1 | 8/2003 | Rai et al. | |
| 2007/0019228 A1 | 1/2007 | Rai et al. | |
| 2007/0030514 A1 * | 2/2007 | Shima | 358/1.15 |
| 2007/0092323 A1 | 4/2007 | Lin et al. | |
| 2007/0247657 A1 | 10/2007 | Zhang et al. | |
| 2007/0247659 A1 | 10/2007 | Zhang et al. | |
| 2007/0293981 A1 | 12/2007 | Rai | |
| 2008/0256541 A1 | 10/2008 | Rai | |
| 2009/0027716 A1 * | 1/2009 | Kuhn et al. | 358/1.15 |
| 2010/0290079 A1 * | 11/2010 | Rai et al. | 358/1.15 |
| 2010/0306637 A1 * | 12/2010 | Jacobs | 715/212 |

* cited by examiner

*Primary Examiner* — Benny Q Tieu
*Assistant Examiner* — Juan M Guillermety
(74) *Attorney, Agent, or Firm* — Fox Rothschild LLP

(57) ABSTRACT

A system for determining batch sizes for a print job may include a computing device and a computer-readable storage medium in communication with the computing device. The computer-readable storage medium may include one or more programming instructions for receiving a print job having a job size, receiving speed information for each of a plurality of document production devices in a production line, identifying a plurality of batches associated with the print job, performing a discrete event simulation to model a makespan for the print job in processing each of the plurality of batches on the plurality of document production devices using the speed information and repeating the identifying and performing until a plurality of final batches is determined, each having a unique final batch size.

15 Claims, 7 Drawing Sheets

| SETUP 1 | PROCESS 1 SPEED | SETUP 2 | PROCESS 2 SPEED | SETUP 3 | PROCESS 3 SPEED | OPTIMAL BATCH SIZE 1 | OPTIMAL BATCH SIZE 2 | OPTIMAL BATCH SIZE 3 | OPTIMAL BATCH SIZE 4 | TOTAL JOB SIZE | TOTAL JOB TIME | EQUAL BATCH TIME | PERCENTAGE IMPROVEMENT |
|---|---|---|---|---|---|---|---|---|---|---|---|---|---|
| 15 | 100 | 15 | 100 | 15 | 100 | 2500 | 2500 | 2500 | 2500 | 10000 | 195.00 | 195.00 | 0.00 |
| 20 | 50 | 15 | 100 | 15 | 100 | 4150 | 2650 | 1900 | 1300 | 10000 | 276.00 | 300.00 | 8.70 |
| 15 | 100 | 20 | 50 | 15 | 100 | 2100 | 4200 | 2450 | 1250 | 10000 | 283.50 | 300.00 | 5.82 |
| 15 | 100 | 15 | 100 | 20 | 50 | 1350 | 1950 | 2550 | 4150 | 10000 | 277.00 | 300.00 | 8.30 |
| 15 | 50 | 15 | 100 | 15 | 150 | 4700 | 2850 | 1450 | 1000 | 10000 | 261.67 | 286.67 | 9.55 |
| 15 | 150 | 15 | 100 | 15 | 50 | 1150 | 1600 | 2600 | 4650 | 10000 | 264.67 | 286.67 | 8.31 |
| 15 | 100 | 15 | 100 | 15 | 100 | 1250 | 1250 | 1250 | 1250 | 5000 | 127.50 | 127.50 | 0.00 |
| 20 | 50 | 15 | 100 | 15 | 100 | 1900 | 1400 | 950 | 750 | 5000 | 167.50 | 175.00 | 4.48 |
| 15 | 100 | 20 | 50 | 15 | 100 | 1250 | 1600 | 1400 | 750 | 5000 | 170.00 | 175.00 | 2.94 |
| 15 | 100 | 15 | 100 | 20 | 50 | 800 | 1100 | 1350 | 1750 | 5000 | 172.00 | 175.00 | 1.74 |
| 15 | 50 | 15 | 100 | 15 | 150 | 1700 | 1400 | 1050 | 850 | 5000 | 159.17 | 165.83 | 4.18 |
| 15 | 150 | 15 | 100 | 15 | 50 | 850 | 1000 | 1250 | 1900 | 5000 | 159.66 | 165.83 | 3.86 |

FIG. 4

METHOD AND SYSTEM OF DETERMINING BATCH SIZES FOR PRINT JOBS IN A PRINT PRODUCTION ENVIRONMENT

TECHNICAL FIELD

This application relates to a method and system for determining batch sizes of print jobs in a print production environment.

BACKGROUND

Conventional print shops are organized in a way that is functionally independent of print job complexity, mix or total volume. Typically, conventional print shops organize resources into separate departments, where each department corresponds to a type of process or operation that is performed on a print job. For example, all printing equipment is typically proximately located while all finishing equipment is typically located in a separate location.

When a print job arrives, it sequentially passes through each department. Once the print job is processed by a first department, the print job is queued to the next department. This approach continues until processing of the print job is complete. However, this conventional approach leads to significant time delays and increased work-in-progress and inventory costs.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a system for determining batch sizes for a print job may include a computing device and a computer-readable storage medium in communication with the computing device. The computer-readable storage medium may include one or more programming instructions for receiving a print job having a job size, receiving speed information for each of a plurality of document production devices in a production line, identifying a plurality of batches associated with the print job, performing a discrete event simulation to model a makespan for the print job in processing each of the plurality of batches on the plurality of document production devices using the speed information and repeating the identifying and performing until a plurality of final batches is determined, each having a unique final batch size. The speed information for each document production device may include a processing speed and a setup time. Each batch may have a unique batch size. The final batches and final batch sizes may minimize the makespan of the print job.

In an embodiment, a system for determining batch sizes for a print job may include a computing module and a processing module in communication with the computing module. The computing module may be configured to receive a print job having a job size, receive speed information for each of a plurality of document production devices in a production line, identify a plurality of batches associated with the print job, perform a discrete event simulation to model a makespan for the print job in processing each of the plurality of batches on the plurality of document production devices using the speed information, and repeat the identifying and performing until a plurality of final batches is determined, each having a unique final batch size. The speed information for each document production device may include a processing speed and a setup time. Each batch may have a unique batch size. The final batches and the unique final batch sizes may minimize the makespan of the print job. The processing module may be configured to split the print job into a second plurality of batches, and process the second plurality of batches on the document production devices. A number of batches in the second plurality of batches may equal a number of batches in the final plurality of batches. A batch size of each batch in the second plurality of batches may correspond to one of the unique final batch sizes.

BRIEF DESCRIPTION OF THE DRAWINGS

Aspects, features, benefits and advantages of the present invention will be apparent with regard to the following description and accompanying drawings, of which:

FIG. 4 illustrates exemplary simulation results according to an embodiment.

DETAILED DESCRIPTION

For purposes of the discussion below, a "job" refers to a logical unit of work that is to be completed for a customer. For example, a job may include pages, batches, units and/or the like. A job may include one or more print jobs from one or more clients. Although the disclosed embodiments pertain to document production environments, the disclosed methods and systems can be applied to production systems in general.

A "print job" refers to a job processed in a document production environment. For example, a print job may include producing credit card statements corresponding to a certain credit card company, producing bank statements corresponding to a certain bank, printing a document or the like.

A "makespan" refers to the total processing time associated with a print job.

A "document production device" refers to a machine or device used to process at least a portion of a print job. Exemplary document production devices may include printers, binders, inserters, collators and/or the like.

A "production line" includes one or more document production devices that process at least a portion of a print job sequentially.

A "print shop" refers to a production environment that processes print jobs. A print shop may be a freestanding entity, including one or more document production devices, or it may be part of a corporation or other entity. Additionally, a print shop may communicate with one or more servers by way of a local area network or a wide area network, such as the Internet, the World Wide Web or the like. A print shop may include a document production environment. A document production environment may be an environment that includes a plurality of document production devices.

Figure 1:
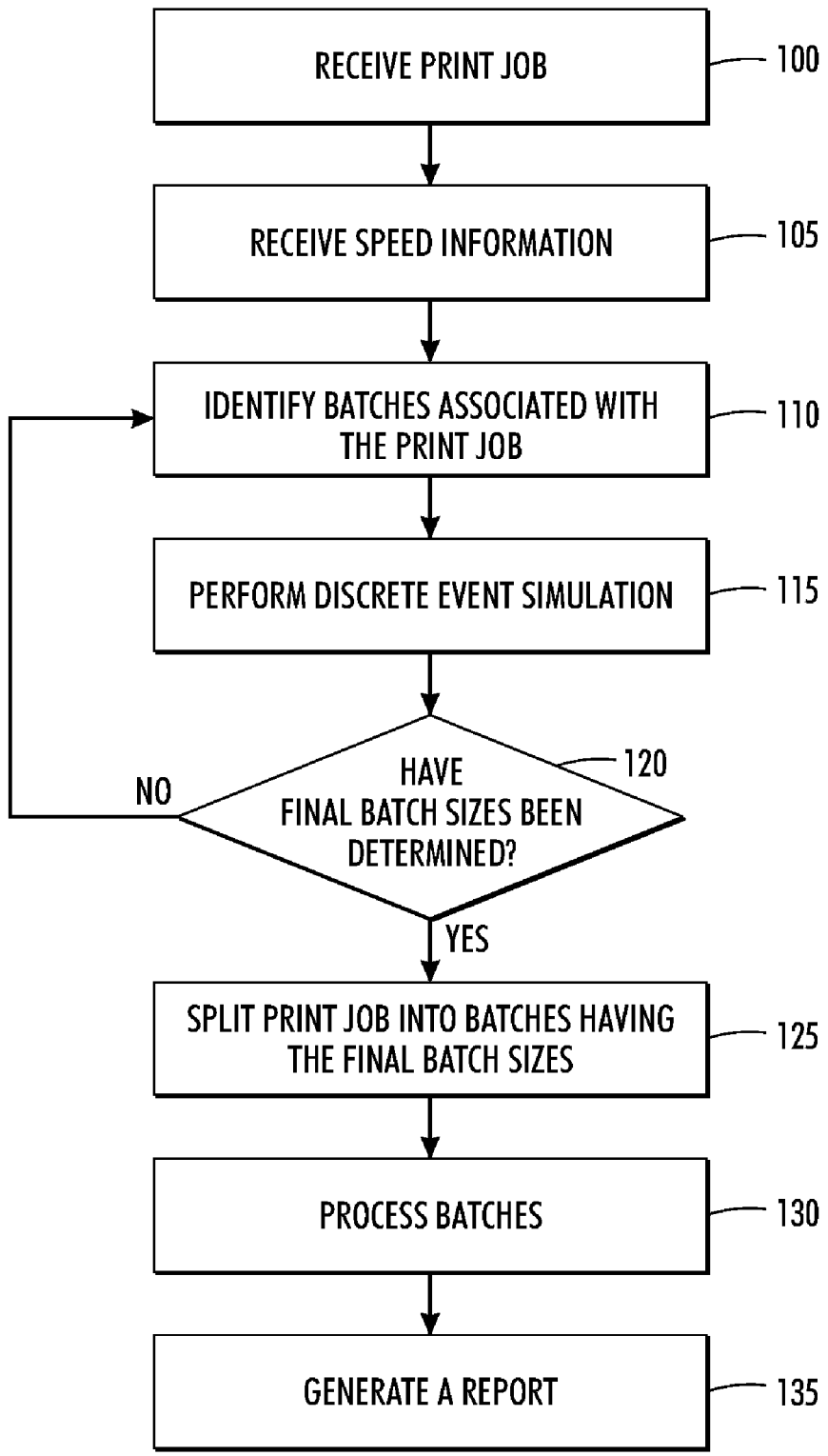
FIG. 1 illustrates an exemplary method of determining batches sizes for a print job that is to be processed by document production devices in a production line according to an embodiment.
Figure 2:
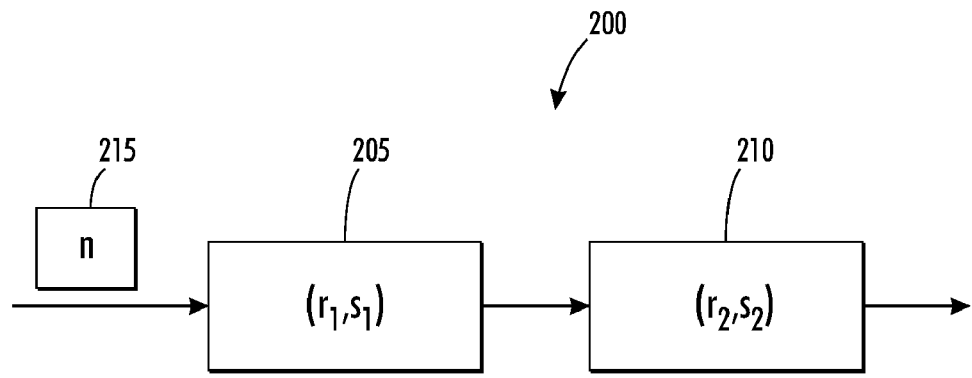
FIG. 2 illustrates an exemplary two-stage production line according to an embodiment.

FIG. 1 illustrates an exemplary method of determining batch sizes for a print job that is to be processed by document production devices in a production line. In an embodiment, a print shop may have one or more production lines. A production line may include one or more document production devices that sequentially process at least a portion of a print job. For example, FIG. 2 illustrates an exemplary two-stage production line 200. As illustrated by FIG. 1, a print job 215 may be received 100 by the production line 200. In an embodiment, the print job 215 may have a corresponding job size, N.

In an embodiment, speed information associated with each document production device in the production line may be received 105. Speed information may include a setup time and/or a processing time associated with a document production device. For example, as illustrated by FIG. 2, each document production device 205, 210 in the production line 200 may have setup times $s_1$ and $s_2$, respectively, and processing rates of $r_1$ and $r_2$, respectively. In an embodiment, a setup time may include the amount of time it takes to prepare, calibrate and test a document production device before it can process a print job. A processing rate may include the amount of time it takes a document production device to process a unit of a print job. For example, a processing rate associated with a printer may be measured in pages per minute. Similarly, a processing rate associated with a binder may be in books or other bound documents per hour. In an embodiment, the speed information may be received directly from one or more of the document production devices. Alternatively, the speed information may be received from one or more computing devices, users and/or the like.

In an embodiment, two or more batches may be identified 110 for a print job 215. Each batch may include at least a portion of the print job, and each batch may have a corresponding batch size. Each batch may be sequentially processed by the document production devices in a production line. In an embodiment, a print job may be split into a number of batches equal to the number of document production devices in a production line. For example, referring to two-device the production line 200 illustrated in FIG. 2, a print job 215 may be split into two batches, having sizes $b_1$ and $b_2$, respectively. An alternate number of batches may also be used within the scope of this disclosure.

Referring to FIG. 2, the first batch may be processed by the first document production device 205. When the first batch has been processed by the first document production device 205, it may be moved to and processed by the second document production device 210. The second batch may be processed by the first document production device 205 while the first batch is being processed by the second document production device 210.

In an embodiment, there may be two possible scenarios for the second batch. First, when the second batch has finished processing on the first document production device 205, the second document processing device 210 may still be processing the first batch. As such, the second batch may be required to wait until the second document production device 210 has finished processing the first batch. This first scenario may be represented by:

$$T = (b_1 r_1 + s_1) + (b_1 r_2 + s_2) + (b_2 r_2 + s_2), \text{ when}$$

$$(b_2 r_1 + s_1) \leq (b_1 r_2 + s_2), \text{ where T=the makespan for the print job.}$$

By performing algebraic manipulation on these equations, the first scenario may be represented by:

$$T = N r_2 + b_1 r_1 + (s_1 + 2 s_2), \text{ when}$$

$$b_1 \geq \frac{N r_1 + (s_1 - s_2)}{(r_1 + r_2)}.$$

Alternately, when the first document production device 205 has finished processing the second batch, the first batch may have already been completely processed by the second document production device 210. In this case, the second batch may begin processing on the second document production device 210 immediately. This second scenario may be represented by:

$$T = N(r_1 + r_2) - b_1 r_2 + (2 s_1 + s_2), \text{ when}$$

$$b_1 \leq \frac{N r_1 + (s_1 - s_2)}{(r_1 + r_2)}.$$

To minimize the makespan, T, $b_1$ and $b_2$ should be minimized, which may be represented by:

$$b_{1min} = \frac{N r_1 + (s_1 - s_2)}{(r_1 + r_2)}, \text{ and}$$

$$b_{2min} = \frac{N r_2 + (s_2 - s_1)}{(r_1 + r_2)}.$$

In an embodiment, referring to FIG. 2, the document production devices 205, 210 may have identical speed and setup characteristics (Case 1). In this case:

$$r_1 = r_2 = r,$$

$$s_1 = s_2,$$

$$b_{1min} = b_{2min} = \frac{N}{2}, \text{ and}$$

$$T = \frac{3}{2} N r + 3 s.$$

In an embodiment, the first document production device 205 may be twice as fast as the second document production device 210, but both document production devices may have the same setup time (Case 2). In this case:

$$r_1 = 2 r_2,$$

$$s_1 = s_2,$$

-continued $$b_{1min} = \frac{2N}{3},$$

$$b_{2min} = \frac{N}{3}, \text{ and}$$

$$T = \frac{7}{6}Nr + 3s.$$

In an embodiment, the second document production device 210 may be twice as fast as the first document production device 205, but both document production devices may have the same setup time (Case 3). In this case:

$$r_1 = \frac{r2}{2},$$

$$s_1 = s_2,$$

$$b_{1min} = \frac{N}{3},$$

$$b_{2min} = \frac{2N}{3}, \text{ and}$$

$$T = \frac{7}{3}Nr + 3s.$$

As such, when document production devices have the same speed and setup characteristics, the print job splits may be identical. However, if a first document production device is faster, the second batch may be larger than the first batch by a factor of two. The total makespan may also change. For example, if:

$s_1 = s_2 = 5$ min,
N=12,000 pages,
$r_1 = 0.01$ minutes/page, then:
 Case 1—T=195 minutes,
 Case 2—T=159 minutes, and
 Case 3—T=291 minutes.

As such, choosing unequal batch sizes may help in reducing the makespan of a print job. In an embodiment, job sizes, $b_i$, may be parameterized such that $$\sum_{i=1}^{m} b_i = N.$$

In an embodiment, referring back to FIG. 1, a discrete event simulation may be performed 115 to model a makespan for a print job. In an embodiment, batches having unique batch sizes that are associated with the print job may be identified 110, and a discrete event simulation may be performed 115 using the batches until a set of final batch sizes are determined 120. The set of final batch sizes may be batch sizes that minimize the makespan associated with the print job.

EXAMPLE 1

Discrete Event Simulation

A discrete event simulation model may include one or more elements of a print job processing workflow. For example, a discrete event simulation model may include one or more document production devices and jobs involved in the print production process. Each document production device may be modeled as having a unique processing rate and a unique setup time. When a job arrives, it may be split into batches. Each batch may be processed by each document production device in a production line. The order of the processes applied to a batch may be based on an order of the document production devices in the production line. The time interval between the arrival of the job and the time at which the last batch exits the final production step may represent the makespan of the job.

Figure 3:
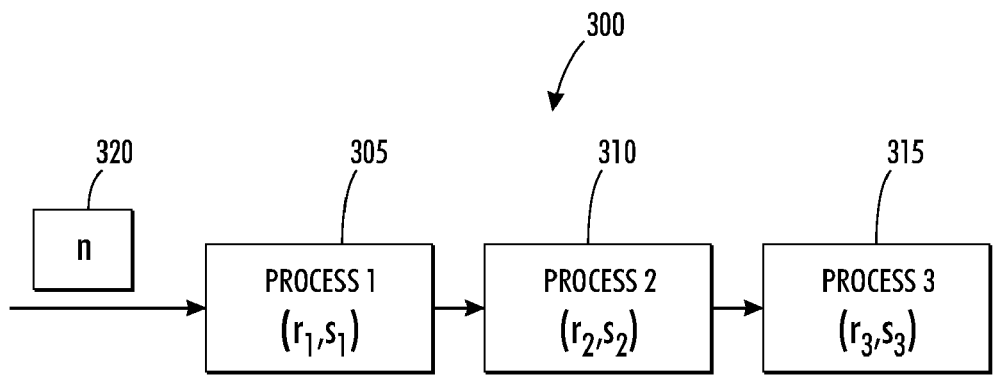
FIG. 3 illustrates an exemplary depiction of the production line according to an embodiment.

Discrete event simulation was performed 115 to model a makespan for a print job processed by a production line having three document production devices. FIG. 3 illustrates an exemplary production line 300 according to an embodiment. As illustrated by FIG. 3, Process 1 corresponds to the first document production device 305, Process 2 corresponds to the second document production device 310 and Process 3 corresponds to the third document production device 315. Processes 1, 2 and 3 may be processes performed by the corresponding document production devices in the processing of the print job 320. FIG. 4 illustrates the simulation results for the five speed scenarios described below.

Scenario 1—Process 1 is slower than both Process 2 and Process 3 and the setup time associated with Process 1 is greater than the setup times associated with either Process 2 or Process 3.

Figure 5:
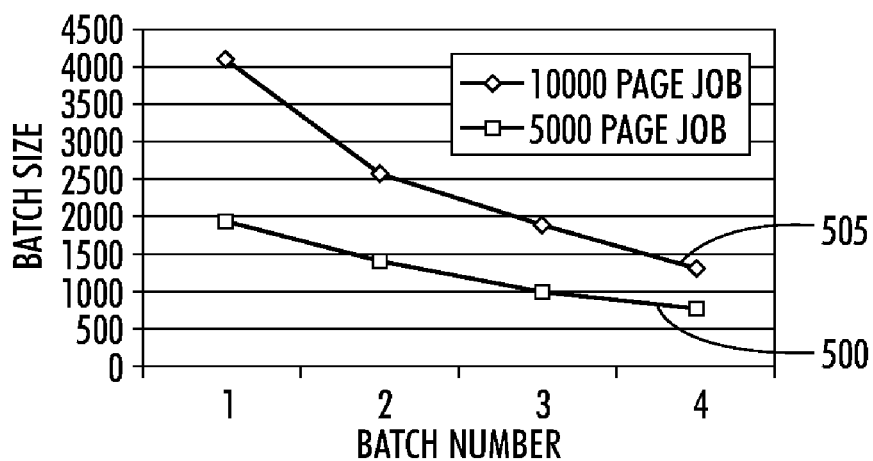
FIGS. 5-9 illustrate graphical representations of exemplary results of simulations according to an embodiment.

FIG. 5 illustrates a graphical representation of the results of simulations for two print jobs that were performed. The results illustrated by FIG. 5 are the batch sizes that minimize the makespan for each print job. As illustrated by FIG. 5, the first simulation was for a 5,000 page print job 500 and the second simulation was for a 10,000 page print job 505. Each print job was split into four batches and each batch was processed by three document production devices, such as those shown in FIG. 3. Process 1 was slower than both Process 2 and Process 3, and the setup time associated with Process 1 was greater than the setup times associated with either Process 2 or Process 3.

FIG. 5 shows a decreasing trend in batch size from batch 1 to batch 4, and an average of 6.59% improvement in total makespan over an equal batching policy was found. As such, these results show that when Process 1 is slower than Process 2 and Process 3, the batch sizes that minimize the makespan may be represented by:

First batch size>Second batch size>Third batch size>Fourth batch size

Scenario 2—Process 2 is slower than both Process 1 and Process 3 and the setup time associated with Process 2 is greater than the setup times associated with either Process 1 or Process 3.

Figure 6:
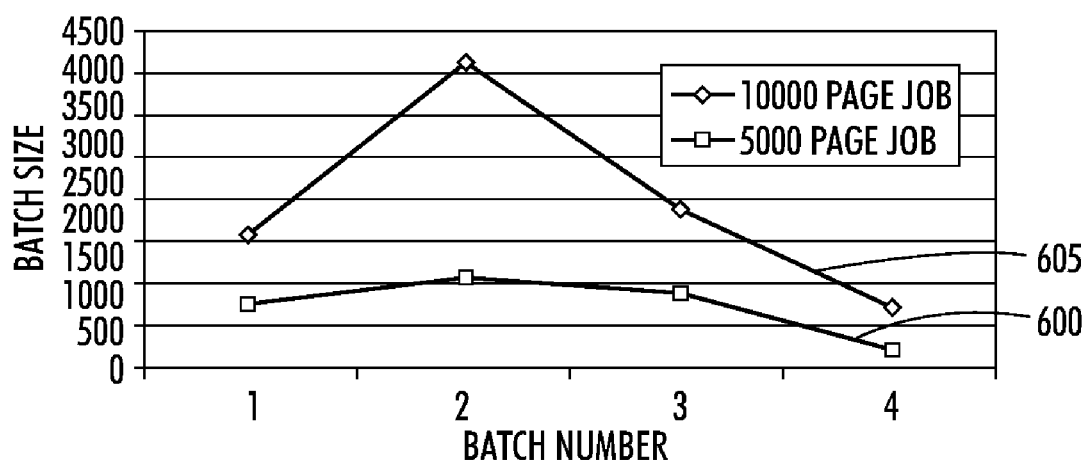

FIG. 6 illustrates a graphical representation of simulations for two print jobs that were performed. The results illustrated by FIG. 6 are the batch sizes that minimize the makespan for each print job. As illustrated by FIG. 6, the first simulation was for a 5,000 page print job 600 and the second simulation was for a 10,000 page print job 605. Each print job was split into four batches, and each batch was processed by three document production devices, such as those shown in FIG. 3. Process 2 was slower than both Process 1 and Process 3, and the setup time associated with Process 2 was greater than the setup times associated with either Process 1 or Process 3.

For the 5,000 page print job, FIG. 6 shows a trend that increases from the first batch to the second batch, slightly decreases from the second batch to the third batch, and then significantly decreases to the fourth batch. The same trend exists for the 10,000 page print job, however, on a more dramatic scale. An average of 4.38% improvement in total makespan was found over an equal batching policy. As shown by FIG. 6, the largest batch size again corresponds to the slowest process. As such, these results further support the idea that the slowest process governs which batch should be the largest.

Scenario 3—Process 3 is slower than both Process 1 or Process 2, and the setup time associated with Process 3 is greater than the setup times associated with either Process 1 or Process 2.

Figure 7:
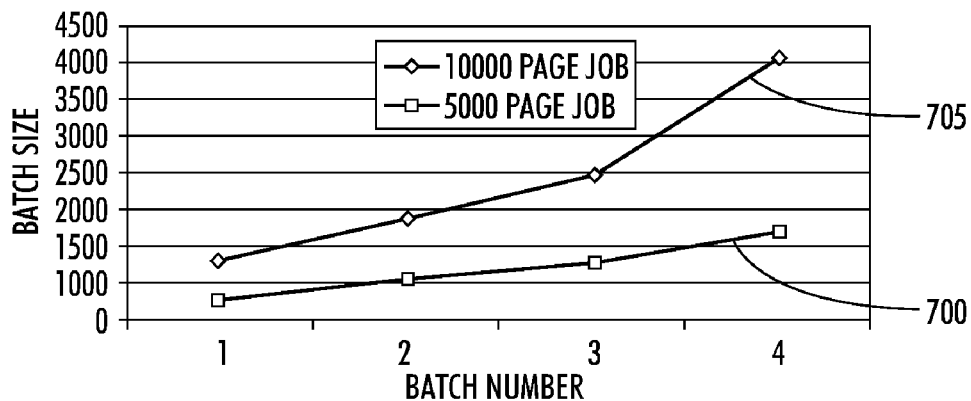

FIG. 7 illustrates a graphical representation of simulations for two print jobs that were performed. The results illustrated by FIG. 7 are the batch sizes that minimize the makespan for each print job. As illustrated by FIG. 7, the first simulation was for a 5,000 page print job 700 and the second simulation was for a 10,000 page print job 705. Each print job was split into four batches and each batch was processed by three document production devices, such as those shown in FIG. 3. Process 3 was slower than both Process 1 or Process 2 and the setup time associated with Process 3 was greater than the setup times associated with either Process 1 or Process 2.

As illustrated by FIG. 7, the first batch is the smallest, the fourth batch is the largest and the batch sizes of the second and third batches increase from the first batch to the fourth batch. As illustrated by FIG. 7, the difference in batch sizes associated with the 10,000 page print job is more dramatic than that associated with the 5,000 page print job. This suggests that the larger the print job size, the more dramatic the effect of variable batch sizing. Between the two print jobs, there was an average of 5.02% improvement in makespan using variable batch sizing as compared to equal batch sizing.

Scenario 4—Process 1 is slower than Process 2, and Process 2 is slower than Process 3. Process 1, Process 2 and Process 3 have the same setup times.

Figure 8:
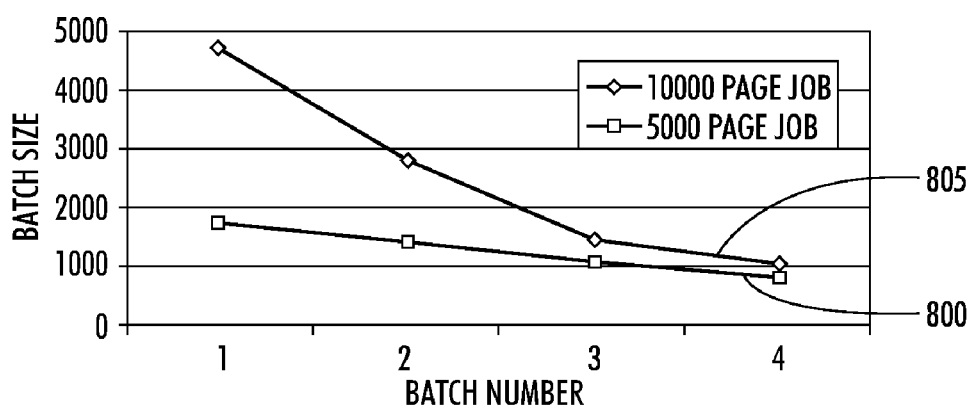

FIG. 8 illustrates a graphical representation of simulations for two print jobs that were performed. The results illustrated by FIG. 8 are the batch sizes that minimize the makespan for each print job. As illustrated by FIG. 8, the first simulation was for a 5,000 page print job 800 and the second simulation was for a 10,000 page print job 805. Each print job was split into four batches, and each batch was processed by three document production devices, such as those shown in FIG. 3. Process 1 was slower than Process 2, and Process 2 was slower than Process 3. Process 1, Process 2 and Process 3 had the same setup times.

FIG. 8 shows that the first batch is the largest and that a decreasing trend exists in batch size from batch 1 to batch 4. An average of 6.87% improvement in total makespan over an equal batching policy was found. Again, these results show that a larger print job exhibits this trend more dramatically than a smaller print job.

Scenario 5—Process 3 is slower than Process 2, and Process 2 is slower than Process 1. Process 1, Process 2 and Process 3 have the same setup times.

Figure 9:
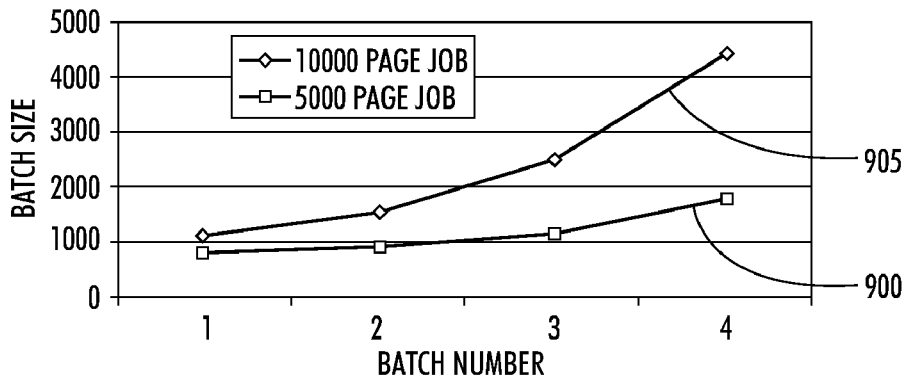

FIG. 9 illustrates a graphical representation of simulations for two print jobs that were performed. The results illustrated by FIG. 9 are the batch sizes that minimize the makespan for each print job. As illustrated by FIG. 9, the first simulation was for a 5,000 page print job 900 and the second simulation was for a 10,000 page print job 905. Each print job was split into four batches, and each batch was processed by three document production devices, such as those shown in FIG. 3. Process 3 was slower than Process 2, and Process 2 was slower than Process 1. Process 1, Process 2 and Process 3 had the same setup times.

As illustrated by FIG. 9, the first batch is the smallest, the fourth batch is the largest, and the second and third batches increase in size between the first batch and the fourth batch. The average improvement in makespan over an equal batching policy was 6.09%.

In an embodiment, a report may be generated 125. The report may include the print job size, the number of batches associated with the print job, the document production devices in the production line, speed information associated with each document production device in the production line, the sizes of the batches that minimize a makespan for the print job, an estimated makespan associated with the print job and/or the like. In an embodiment, the report may be provided to a print shop operator. For example, a report may be printed, emailed and/or faxed to a print-shop operator.

In an embodiment, the report may be used to split 130 the print job into a number of batches determined by the simulation, such that each batch has a batch size that is determined by the simulation. In an embodiment, the simulation may determine which batch corresponds to which batch size.

In an embodiment, each batch may be processed 135 by the document production devices in the production line. In an embodiment, the batches may be processed 130 in a specific order. For example, if the discrete simulation model determines that a print job should be split into three batches (batch 1, batch 2 and batch 3), each having a corresponding batch size, then batch 1 may be processed 130 first, followed by batch 2 and then by batch 3.

Figure 10:
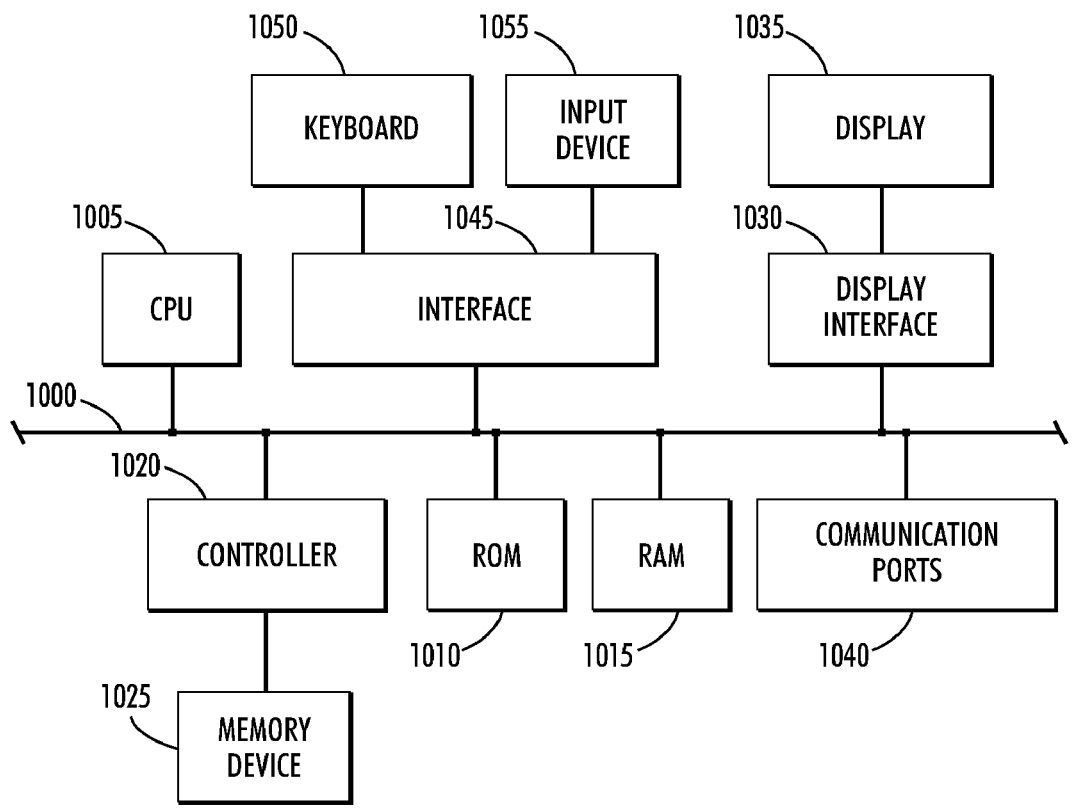
FIG. 10 illustrates exemplary internal hardware that may be used to contain or implement program instructions according to an embodiment.

FIG. 10 depicts a block diagram of exemplary internal hardware that may be used to contain or implement program instructions according to an embodiment. A bus 1000 serves as the main information highway interconnecting the other illustrated components of the hardware. CPU 1005 is the central processing unit of the system, performing calculations and logic operations required to execute a program. Read only memory (ROM) 1010 and random access memory (RAM) 1015 constitute exemplary memory devices.

A controller 1020 interfaces with one or more optional memory devices 1025 to the system bus 1000. These memory devices 1025 may include, for example, an external or internal DVD drive, a CD ROM drive, a hard drive, flash memory, a USB drive or the like. As indicated previously, these various drives and controllers are optional devices.

Program instructions may be stored in the ROM 1010 and/or the RAM 1015. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interface 1030 may permit information from the bus 1000 to be displayed on the display 1035 in audio, visual, graphic or alphanumeric format. Communication with external devices may occur using various communication ports 1040. An exemplary communication port 1040 may be attached to a communications network, such as the Internet or an intranet.

The hardware may also include an interface 1045 which allows for receipt of data from input devices such as a keyboard 1050 or other input device 1055 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

Figure 11:
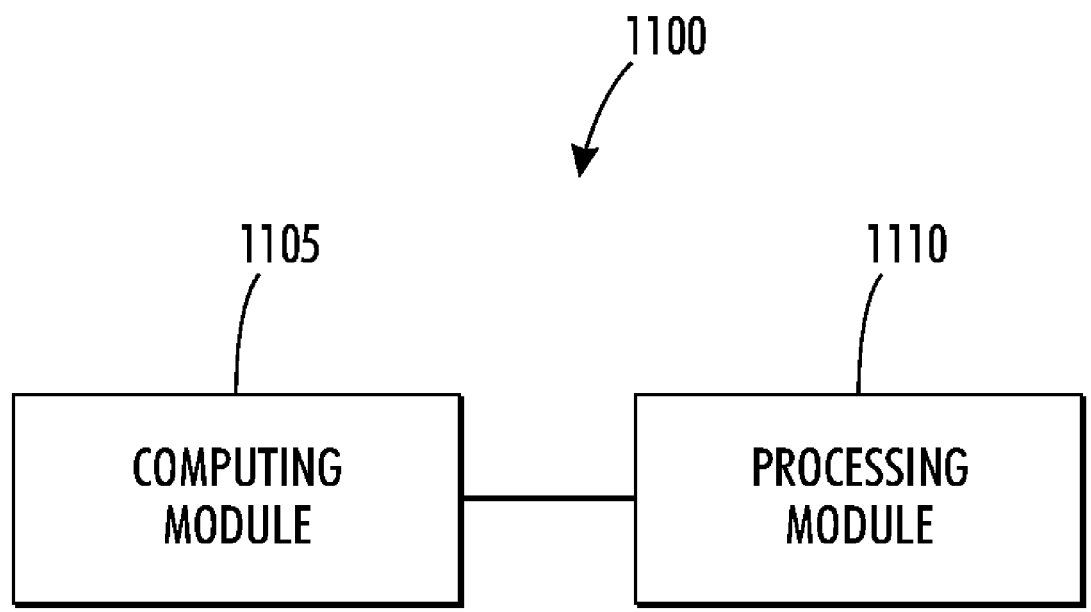
FIG. 11 illustrates an exemplary system for determining batch sizes associated with a print job according to an embodiment.

FIG. 11 illustrates an exemplary system for determining batch sizes associated with a print job according to an embodiment. They system 1100 may include one or more modules 1105, 1110. In an embodiment, a module may be a self-contained hardware and/or software component that is capable of interacting with a larger system. As illustrated by FIG. 11, the system may include a computing module 1105 and a processing module 1110. The computing module 1105 and processing module 1110 may be in communication with one another.

A computing module 1105 may be configured to determine a number of batches and batch sizes for a print job that minimizes the makespan associated with the print job. The computing module 1105 may also be configured to generate a report regarding this information and to send this report to the processing module. The processing module 1110 may be configured to use the information in the report to split the print job into an appropriate number of batches of specified size, and processing the batches on document production devices in a production line.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for determining batch sizes for a print job, the system comprising:
   a computing device; and
   a computer-readable storage medium in communication with the computing device, wherein the computer-readable storage medium comprises one or more programming instructions for:
   receiving a print job having a job size,
   receiving speed information for each of a plurality of document production devices in a production line, wherein the speed information for each document production device comprises a processing speed and a setup time,
   identifying a plurality of batches associated with the print job, wherein each batch has a batch size that is unequal to the batch sizes of the other batches in the plurality of batches, wherein a number of batches in the plurality of batches is equal to a number of document production devices in the plurality of document production devices, wherein a sum of the batch sizes associated with the plurality of batches equals the job size,
   performing a discrete event simulation to model a makespan for the print job in processing each of the plurality of batches on the plurality of document production devices using the speed information, and
   repeating the identifying and performing until a plurality of final batches is determined, each having a final batch size that is unequal to the final batch sizes of the other final batches in the plurality of final batches, wherein the final batches and final batch sizes minimize the makespan of the print job.

2. The system of claim 1, wherein the one or more programming instructions for receiving speed information comprise one or more programming instructions for receiving speed information from one or more of the plurality of document production devices in the production line.

3. The system of claim 1, wherein the one or more programming instructions for receiving speed information comprise one or more programming instructions for receiving speed information from a user.

4. The system of claim 1, wherein the computer-readable storage medium further comprises one or more programming instructions for generating a report comprising one or more of the following:
   the job size;
   a number of final batches in the plurality of final batches;
   the final batch sizes; speed information associated with one or more of the document production devices; and
   an estimated makespan associated with the print job.

5. A method of determining batch sizes for a print job, the method comprising:
   receiving a print job having a job size;
   receiving, by a computing device, speed information for each of a plurality of document production devices in a production line, wherein the speed information for each document production device comprises a processing speed and a setup time;
   identifying a plurality of batches associated with the print job, wherein each batch has a batch size that is unequal to the batch sizes of the other batches in the plurality of batches, wherein a number of batches in the plurality of batches is equal to a number of document production devices in the plurality of document production devices, wherein a sum of the batch sizes associated with the plurality of batches equals the job size;
   performing a discrete event simulation on the computing device to model a makespan for the print job in processing each of the plurality of batches on the plurality of document production devices using the speed information; and
   repeating the identifying and performing until a plurality of final batches is determined, each having a final batch size that is unequal to the final batch sizes of the other final batches in the plurality of final batches, wherein the final batches and final batch sizes minimize the makespan of the print job.

6. The method of claim 5, wherein receiving speed information comprises receiving speed information from one or more of the plurality of document production devices in the production line.

7. The method of claim 5, wherein receiving speed information comprises receiving speed information from a user.

8. The method of claim 5, further comprising splitting the print job into a second plurality of batches, wherein a number of batches in the second plurality of batches equals a number of batches in the final plurality of batches, wherein a batch size of each batch in the second plurality of batches corresponds to one of the final batch sizes.

9. The method of claim 8, further comprising processing the second plurality of batches on the plurality of document production devices.

10. The method of claim 5, further comprising generating a report comprising one or more of the following:
    the job size;
    a number of final batches in the plurality of final batches;
    the final batch sizes;
    speed information associated with one or more of the document production devices; and
    an estimated makespan associated with the print job.

11. The method of claim 5, wherein:
    receiving speed information for each of a plurality of document production devices in a production line comprises receiving first speed information for a first document production device and second speed information for a second document production device, wherein the processing speed associated with the first document production device is twice as fast as the processing speed associated with the second document production device, wherein the setup time associated with the first document production device equals the setup time associated with the second document production device, identifying a plurality of batches associated with the print job comprises identifying a first batch and a second batch, wherein the batch size associated with the first batch is equal to approximately two-thirds of the job size, wherein the batch size associated with the second batch is equal to approximately one-third of the job size.

12. The method of claim 5, wherein:

receiving speed information for each of a plurality of document production devices in a production line comprises receiving first speed information for a first document production device and second speed information for a second document production device, wherein the processing speed associated with the second document production device is twice as fast as the processing speed associated with the first document production device, wherein the setup time associated with the first document production device equals the setup time associated with the second document production device, identifying a plurality of batches associated with the print job comprises identifying a first batch and a second batch, wherein the batch size associated with the first batch is equal to approximately one-third of the job size, wherein the batch size associated with the second batch is equal to approximately two-thirds of the job size.

13. A system for determining batch sizes for a print job, the system comprising:

a computing device; and a computer-readable storage medium in communication with the computing device, wherein the computer-readable storage medium comprises one or more programming instructions for:

receiving a print job having a job size, receiving speed information for each of a plurality of document production devices in a production line, wherein the speed information for each document production device comprises a processing speed and a setup time, identifying a plurality of batches associated with the print job, wherein each batch has a batch size that is unequal to the batch sizes of the other batches in the plurality of batches, wherein a number of batches in the plurality of batches is equal to a number of document production devices in the plurality of document production devices, wherein a sum of the batch sizes associated with the plurality of batches equals the job size, performing a discrete event simulation to model a makespan for the print job in processing each of the plurality of batches on the plurality of document production devices using the speed information, repeating the identifying and performing until a plurality of final batches is determined, each having a final batch size that that is unequal to the batch sizes of the other batches in the plurality of batches, wherein the final batches and final batch sizes minimize the makespan of the print job, splitting the print job into a second plurality of batches, wherein a number of batches in the second plurality of batches equals a number of batches in the final plurality of batches, wherein a batch size of each batch in the second plurality of batches corresponds to one of the final batch sizes; and a plurality of document production devices in communication with the computing device, wherein the document production devices are configured to process the second plurality of batches.

14. The system of claim 13, wherein the one or more programming instructions for receiving speed information comprise one or more programming instructions for receiving speed information from the plurality of document production devices.

15. The system of claim 13, wherein the computer-readable storage medium further comprises one or more programming instructions for generating a report comprising one or more of the following:

the job size;

a number of final batches in the plurality of final batches;

the final batch sizes; speed information associated with one or more of the document production devices; and an estimated makespan associated with the print job.

* * * * *